United States Patent [19]

Parks

[11] Patent Number: 4,958,845
[45] Date of Patent: Sep. 25, 1990

[54] EXTENDABLE TRAILER APPARATUS

[76] Inventor: Donald J. Parks, 7310 W. Hazelwood, Phoenix, Ariz. 85033

[21] Appl. No.: 355,493

[22] Filed: Jun. 19, 1989

Related U.S. Application Data

[63] Continuation-in-part of Ser. No. 245,027, Sep. 16, 1988, abandoned.

[51] Int. Cl.$^5$ .............................................. B62D 53/08
[52] U.S. Cl. ............................... 280/407.1; 280/405.1; 280/149.2; 296/184; 298/22 R; 298/30
[58] Field of Search ............... 280/404, 405.1, 407, 280/407.1, 408, 81.1, 149.2, 837; 296/15, 184; 298/7, 22 R, 29, 30, 1 A

[56] References Cited

U.S. PATENT DOCUMENTS

| | | | |
|---|---|---|---|
| 1,621,075 | 3/1927 | Larkin | 298/22 R |
| 1,627,336 | 5/1927 | Nelson | 296/184 |
| 2,682,419 | 6/1954 | Wolf | 280/405.1 |
| 2,831,700 | 4/1958 | Sheppard et al. | 280/81.1 |
| 2,831,735 | 4/1958 | Bennett et al. | 308/3 |
| 2,835,504 | 5/1958 | Acker | 280/81.1 |
| 2,841,411 | 7/1958 | Sheppard et al. | 280/81.1 |
| 3,146,000 | 8/1964 | Holzman | 280/81.1 |
| 3,152,837 | 10/1964 | Margala | 280/149.2 X |
| 3,181,914 | 5/1965 | Humes | 280/149.2 X |
| 3,410,576 | 11/1968 | Turpen | 280/81.1 X |
| 3,508,762 | 4/1970 | Pratt | 280/81.1 |
| 3,729,214 | 4/1973 | Mulcahy et al. | 280/407 |
| 3,893,710 | 7/1975 | Madura | 280/407 |
| 4,021,074 | 5/1977 | Heiser | 296/184 X |
| 4,111,450 | 9/1978 | Pinto | 280/408 X |
| 4,365,820 | 12/1982 | Rush | 280/149.2 X |
| 4,397,476 | 8/1983 | Bolyard et al. | 280/656 |
| 4,429,892 | 2/1984 | Frampton et al. | 280/407 |
| 4,478,547 | 10/1984 | Den Boer | 414/245 |
| 4,526,395 | 7/1985 | Arguin | 280/408 |
| 4,561,671 | 12/1985 | DeWitt et al. | 280/404 |
| 4,566,714 | 1/1986 | DeWitt et al. | 280/404 |
| 4,580,805 | 4/1986 | Bertolini | 280/405.1 |

FOREIGN PATENT DOCUMENTS

| | | | |
|---|---|---|---|
| 1464476 | 12/1966 | France | 296/184 |
| 2379400 | 10/1978 | France | 296/15 |

OTHER PUBLICATIONS

E-Z Dumper "dump unit for pickup trucks" Jerr-Dan Corp., 9/26/79.

Primary Examiner—Charles A. Marmor
Assistant Examiner—Brian L. Johnson
Attorney, Agent, or Firm—H. Gordon Shields

[57] ABSTRACT

Extendable trailer apparatus includes a fixed frame and a frame slidably connected to the fixed frame and movable relative to the fixed frame for lengthening and shortening the trailer apparatus. The movable rear frame includes an axle and wheels secured to it, and a load is secured to the fixed frame. The two frames are movable for adjusting the weight of the load on trailer axles including axles secured to the fixed portion of the trailer and an axle or axles secured to the movable frame. One embodiment of the apparatus includes an end dump bed with tapered sides and a sloping bottom for enhancing the dumping capabilities.

13 Claims, 4 Drawing Sheets

EXTENDABLE TRAILER APPARATUS

CROSS REFERENCE TO RELATED APPLICATION

This application is a continuation-in-part application of copending application Ser. No. 245,027, filed Sept. 16, 1988, and now abandoned.

BACKGROUND OF THE INVENTION

1. Field of the Invention:

This invention relates to trailers, and, more particularly, to trailers secured to tractors for transporting loads.

2. Description of the Prior Art:

U.S. Pat. No. 4,397,476 (Bolyard et al), U.S. Pat. No. 4,561,671 (DeWitt et al) and U.S. Pat. No. 4,566,714 (DeWitt et al) all disclose trailers with movable frame assemblies. The three patents are similar in that the length of the trailer is varied in each patent by a single telescoping element. However, the apparatus of the '476 patent does not transfer a fixed load weight, but merely telescopes for transporting and storing purposes. The apparatus of the '671 and '714 patents change trailer lengths for the purpose of accommodating a container of different lengths.

There are other patents which discloses a fixed frame and a movable frame utilizing sliding elements.

U.S. Pat. No. 3,682,419 (Wolf) is one example of trailer apparatus including movable trailer portions. The '419 patent discloses a trailer apparatus in which the length of the trailer remains constant, but the rear wheel and axle portion is movable between two locations. The movable rear wheel and axle portions do not extend beyond the fixed frame, and thus do not extend beyond the trailer load.

U.S. Pat. No. 2,831,700 (Sheppard et al) discloses a locking system for locking the rear axle and wheel assembly of a trailer. As in the '419 patent, the trailer length is fixed and the rear wheel and axle portion is movable or variable between a plurality of locations. The slidable wheel and axle portion is not a load supporting frame assembly, and does not extend beyond the load bearing frame or the load.

U.S. Pat. No. 2,831,735 (Bennett et al) discloses another trailer apparatus in which the trailer length itself is fixed, but the location of the rear wheel and axle unit is longitudinally adjustable. Details of the adjusting elements, including the locks, are specifically claimed. Again, the rear wheel and axle unit is not a load supporting frame assembly and does not extend beyond the load bearing frame.

U.S. Pat. No. 2,835,504 (Acker) discloses still another example of a trailer having a fixed length with a movable rear axle system. The apparatus is primarily concerned with the control system and the locking system for the trailer apparatus. And again, the movable wheel and axle assembly is not a load bearing frame assembly and it does not move beyond the load carrying frame.

U.S. Pat. No. 2,841,411 (Sheppard et al) discloses apparatus similar to the '700 apparatus discussed above. It will be noted that both patents have the same inventors. The locking system for the rear wheel and axle assembly is described and claimed in detail. As with the above-discussed patents, the movable wheel and axle assembly is not a load bearing frame assembly and it does not move outwardly beyond the load bearing frame.

U.S. Pat. No. 3,146,000 (Holtzman) discloses another system in which the general length of the trailer itself is fixed, and the wheel and axle assembly moves relative to the frame. Several roller systems for adjusting the running gear or wheel and axle assembly are shown. Again, the load bearing frame is fixed, and the movable portion does not extend beyond the fixed, load bearing frame.

U.S. Pat. No. 3,410,576 (Turpen) discloses a reversible tandemaxle semitrailer. There is a single semitrailer with a pair of wheel and axle assemblies that are movable between the front and the rear of the semitrailer so that the semitrailer may be pulled from either end. The semitrailer includes two hitch elements, one hitch element at each end of the trailer. The wheel and axle elements are individually movable to position each axle in a desired location with respect to the trailer. Both axles may be positioned adjacent to each other at opposite ends of the trailer or one axle may be positioned near the center while the other axle may be positioned at the rear, as desired, depending on the particular load being hauled on the trailer. The load bearing frame is fixed and does not vary.

U.S. Pat. No. 3,508,762 (Pratt) discloses an extendable trailer system in which the frame itself is actually lengthened. The apparatus includes a fixed frame having I beam elements and tubular elements which telescope on the I beams. Rollers are required between the I beams and the tubular elements. The load itself rides on the moving elements. The frame members accordingly must be moved and fixed in place before the load is placed on the frame members.

U.S. Pat. No. 4,111,450 (Pinto) discloses a trailer having the capacity to connect to a tractor at both ends. At the bottom of the trailer sides, and inwardly from the outer ends of the trailer, are a pair of longitudinally extending rails which comprise eye beams. The eye beams comprise fixed rails secured to the trailer bed. There are extension rails that may be aligned longitudinally with the fixed rails. The rail extensions will fit both ends of the trailer to allow trailer wheel and axle assemblies to be positioned as desired with respect to the trailer. For connecting the trailer to a tractor from one end, the rail extensions are disposed at the opposite end of the trailer, and wheel and axle assemblies are appropriately secured to the rails and rail extensions. No part of the sliding or movable portion extends beyond the main frame.

The '450 apparatus also includes provisions for connecting a pivotable or steerable axle to the trailer through a movable or slidable kingpin assembly. For purposes of the apparatus of the present invention, the movable kingpin assembly and steerable axle elements are immaterial.

U.S. Pat. No. 4,365,820 (Rush) discloses a trailer which includes movable running gear so as to connect a plurality of trailers in tandem through fifth wheel assemblies secured to the running gear. The running gear includes a pair of axles, both of which are secured to longitudinally extending frame members. The flanges of the vertically and longitudinally aligned eye beams bear directly against each other and channel lengths secured to the lower of the eye beam pairs are used as guide elements. No provision is made for lubricants. The apparatus is not designed for, and has no applicability to, bridge laws and the distribution of load weights.

U.S. Pat. No. 4,478,547 (Den Boer) discloses an extensible trailer system with multiple portions. The apparatus has no applicability to bridge laws or to the distribution of load weights.

U.S. Pat. No. 4,526,395 (Arguin) discloses a tandem trailer system with a movable slider portion that includes a fifth wheel assembly for securing a second trailer in tandem with the first trailer that is connected directly to the tractor. The movable slider portion of the trailer, that portion which includes the fifth wheel, is disclosed as including three sets of wheel and axle pairs. The movable frame is movable on a pair of vertically oriented I beams and is appropriately secured together by a channel element secured to the bottom beam member. Direct contact between the adjacent flanges of the beams is prevented by means of an insert or slide pad. Slide pads are appropriately secured to the bottom of the lower flange of the upper I beam. The I beam assemblies are locked together by appropriately actuable pins which extend through aligned apertures in locking plates and in the vertical flange of the upper beam.

The purpose of the sliding undercarriage or chassis portion is not to extend the length of the trailer bed for bridge law purposes, but rather simply to facilitate the tandem pulling arrangement of a pair of trailers by a single tractor. This is also the primary purpose of the '820 patent discussed above. The sliding undercarriage apparently cannot be moved with a load on the trailer. No provision is made for lubrication because lubrication does not appear to be necessary.

U.S. Pat. No. 4,580,805 (Bertolini) discloses an extensible trailer system which utilizes a rack and pinion system for moving the trailer frame portions. Roller chain dollies on the movable frame roll on fixed flanges of the fixed frame. The movable frame axles do not extend rearwardly of the fixed frame.

U.S. Pat. No. 1,627,336 (Nelson) discloses a dump body in which the dump bed tapers from the front to the rear. The dump body is narrowest at the front end, and tapers outwardly or flares outwardly to the widest portion at the outer end, where material is dumped. In addition to the tapering of the bed from the front outwardly, the sides of the bed also include a taper. The taper is narrowest at the top and the walls taper outwardly to the bottom of the bed. At the outer end of the trailer, the walls are substantially vertical. Thus, the taper of the walls varies from maximum taper at the front of the trailer bed to virtually zero or vertical alignment at the outer end of the dump bed. The bottom of the bed is flat or planar over its entire length.

U.S. Pat. No. 3,152,837 (Margala) discloses a combination dump trailer that includes a pair of dump portions on a single chassis. Essentially, the dump portions comprise separate dump beds disposed on a single chassis. The undercarriage of the single bed is movable between two positions so that the tractor may be connected to both ends of the trailer to facilitate the dumping. The movable undercarriage has no applicability to bridge laws, and the movable frame does not extend beyond the fixed frame. The guide elements are relatively short, and they do not extend over even a substantial length of the movable frame.

A single cylinder is used for dump purposes. The single cylinder, in the center of the trailer chassis, is selectively securable to both dump beds for appropriate pivoting movement to dump the contents of the dump beds.

U.S. Pat. No. 3,181,914 (Humes) discloses a dump trailer assembly which includes a sliding undercarriage. The undercarriage moves for purposes of complying with appropriate bridge laws. The undercarriage includes a fixed eye beam assembly and a lower eye beam assembly, but the eye beam assemblies do not move on each other during movement of the sliding undercarriage. Rather, there are roller assemblies on which the undercarriage moves while moving between the inner and outer positions of the undercarriage. Locking supports required at both positions of the sliding undercarriage. Guide elements are relatively short. Only one axle extends beyond the fixed frame. The second axle remains beneath the fixed frame.

U.S. Pat. No. 4,021,074 (Heiser) discloses a vehicle trailer designed to be pulled by a pickup truck. The trailer and pickup truck utilize a fifth wheel connection. The dump bed portion of the trailer includes a sloping bottom or bed. The purpose of the sloping bottom is for convenience in design, to allow the dump trailer to be pulled by a pickup truck, as opposed to convenience in dumping the load from the trailer. Obviously, the sloping bottom will facilitate the dumping, but such is not the purpose of the sloping bottom. Moreover, the bottom has only a single slope. With a single slope, the load could shift during transit and significant problems could arise therefrom.

French Patent No. 1,464,476 (Richebois) discloses a dump trailer which includes tapering side walls. The width of the dump bed tapers outwardly from a minimum at the front of the trailer to a maximum at the rear or tailgate of the trailer. The bottom of the trailer appears to be relatively flat. The sides appear to be relatively vertical, with rounded or coved portions between the sides and the bottom. The height of the sides vary from maximum at the front of the bed to minimum at the rear of the bed.

It will be noted that of the patents discussed above that include slidable undercarriages, the forward axle of a pair of axles that slide is never found outboard of the trailer itself. One axle of a pair of axles may extend rearwardly from the primary trailer frame, but one axle is always shown beneath the rear portion of the primary trailer frame. Moreover, it will also be noted that the patents are noticeably silent regarding the sliding characteristics of the movable frame assemblies, particularly with respect to lubrication and/or cleaning of the relatively movable elements.

The apparatus of the present invention overcomes the problems or limitations of the prior art by providing a sliding undercarriage which accommodates current bridge laws and which includes axle assemblies outwardly from, or to the rear of, the rear most portion of the primary or fixed trailer frame and which provides for the cleaning and lubrication of the relatively movable frame members.

SUMMARY OF THE INVENTION

The invention described and claimed herein comprises an extendable (or extensible) trailer having a fixed frame which includes a pair of longitudinally extending frame members, and a movable frame which includes a second pair of longitudinally extending frame members disposed adjacent to and movable on the first pair of frame members, and means for locking and unlocking the two pairs of longitudinally extending frame members. A load hauling bed is disposed on the first pair of frame members. One embodiment of the load hauling bed includes tapered side walls and a sloping bottom, rendering the load hauling bed particularly adapted for end dump purposes.

Among the objects of the present invention are the following:

To provide new and useful extendable trailer apparatus;

To provide new and useful extendable trailer apparatus utilizing two pairs of longitudinally extending frame members movable relative to each other;

To provide new and useful trailer apparatus having a fixed frame and a relatively movable frame and pin elements for securing the two frames together;

To provide new and useful extendable trailer apparatus including a first pair of beam members and a second pair of beam members disposed adjacent to and movable relative to the first pair of beam members;

To provide new and useful extendable trailer apparatus utilizing an end dump load carrying bed apparatus;

To provide new and useful end dump load carrying bed apparatus including tapered sides;

To provide new and useful end dump bed apparatus having a longitudinally extending sloping bottom; and To provide new and useful extendable trailer apparatus adaptable to transport loads in one configuration and to be loaded and unloaded in another configuration.

DESCRIPTION OF THE PREFERRED EMBODIMENT

Figures 1A, 1B:
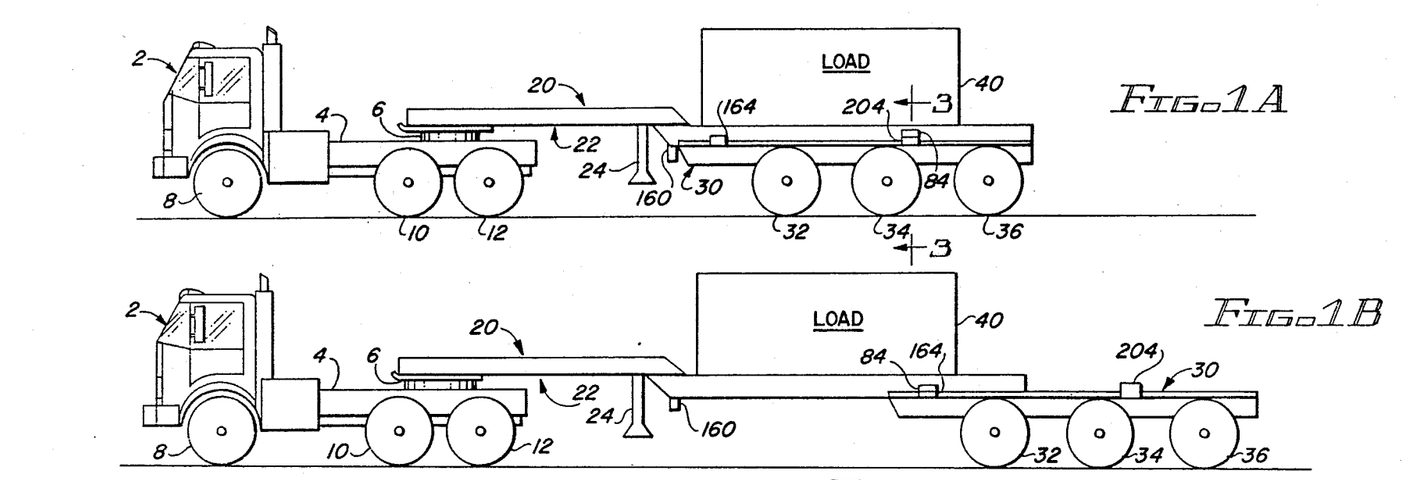
FIG. 1A is a side view of the apparatus of the present invention in a loading-unloading configuration.
FIG. 1B is a side view of the apparatus of the present invention in a transport configuration.

FIG. 1A is a side view of a tractor 2 connected to a trailer 20. The trailer 20 represents one embodiment of the apparatus of the present invention.

The tractor 2 includes a bed or frame 4 with a trailer hitch 6 secured to the bed or frame 4. The tractor 2 includes three sets of wheel and axle assemblies. The wheel and axle assemblies include a front wheel and axle assembly 8, which is the steering wheels. The tractor 2 also includes a pair of drive wheel and axle assemblies, including a drive wheel and axle assembly 10 and a drive wheel and axle assembly 12.

The trailer 20 includes a fixed frame 22 which is appropriately secured to the hitch assembly 6 of the tractor 2. The fixed frame 22 includes support legs 24 which are appropriately lowered and raised, as necessary. The trailer 20 also includes a movable frame assembly 30. The movable frame assembly 30 moves on the fixed frame assembly 22 forwardly and rearwardly, as will be discussed in detail below. The movable frame assembly 30 includes, for illustrative purposes, three sets of wheel and axle assemblies. They include a wheel and axle assembly 32, a wheel and axle assembly 34, and a wheel and axle assembly 36. Obviously, the movable frame assembly 30 may include two sets of wheel and axle assemblies, as desired or as appropriate under the circumstances. For example, the trailer embodiment of FIGS. 6 and 7 utilizes two wheel and axle assemblies.

A load 40 is shown in FIG. 1A disposed on the fixed frame assembly 22.

FIG. 1B is a side view of the truck apparatus 2 and the trailer apparatus 20 of FIG. 1A, with a load 40 disposed on the trailer apparatus 20, and with the movable frame assembly 30 moved rearwardly with respect to the fixed frame assembly 22. In FIG. 1A, the load 40 is disposed generally over the wheel and axle assemblies 32, 34, and 36. In FIG. 1B, with the movable frame assembly 30 moved rearwardly with respect to the fixed frame assembly 22 and the load 40, the load 40 is disposed between the wheel and axle assemblies 10 and 12 of the tractor 2 and the wheel and axle assemblies 32, 34, and 36 of the trailer 20. It will be noted that the movable frame assembly 30 comprises, in overall length, about half that of the fixed frame assembly 22. In the extended, transport, or open configuration, the trailer apparatus 20 is about one-third longer than when it is in the closed or nested or loading and unloading, configuration.

Figures 2A, 2B:
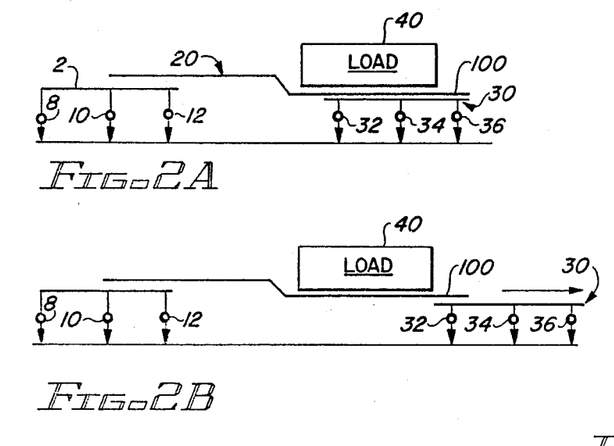
FIG. 2A is a schematic representation of the apparatus of FIG. 1A.
FIG. 2B is a schematic representation of the apparatus of FIG. 1B.

FIG. 2A and FIG. 2B are schematic representations of the tractor apparatus 2 and the trailer apparatus 20 of FIGS. 1A and 1B, schematically illustrating the orientation or disposition of the load 40 with respect to the wheel and axle assemblies of the tractor 2 and the trailer 20. In the closed position shown in FIG. 2A, the load 40 is primarily on the rear axles 32, 34, and 36. In the operation as shown in FIG. 2B, the weight of the load 40 is shifted. Part of the weight is transferred to the steering axle assembly 8 and part of the weight is transferred to the rear tractor driving axles 10 and 12. This will be discussed in greater detail below.

Moreover, the ease of loading and unloading the trailer 20 is also increased or enhanced by the movable frame assembly 30. It is convenient to place the load 40 on a trailer 20, and specifically on the fixed frame portion 22 thereof, when the movable frame assembly 30 is in its "closed" position. Then, when the movable frame assembly 30 is moved rearwardly, or "opened" with respect to the platform or bed 100 and with respect to the fixed frame assembly 22, the load 40 is appropriately distributed between the steering and the other wheels and axles for transport purposes and in accordance with contemporary bridge laws and regulations. Thus, the load is appropriately balanced among the various wheel and axle assemblies for proper distribution of the load to greatly or substantially enhance the load bearing and hauling capabilities of the trailer 20 and the tractor 2.

Figures 3, 4:
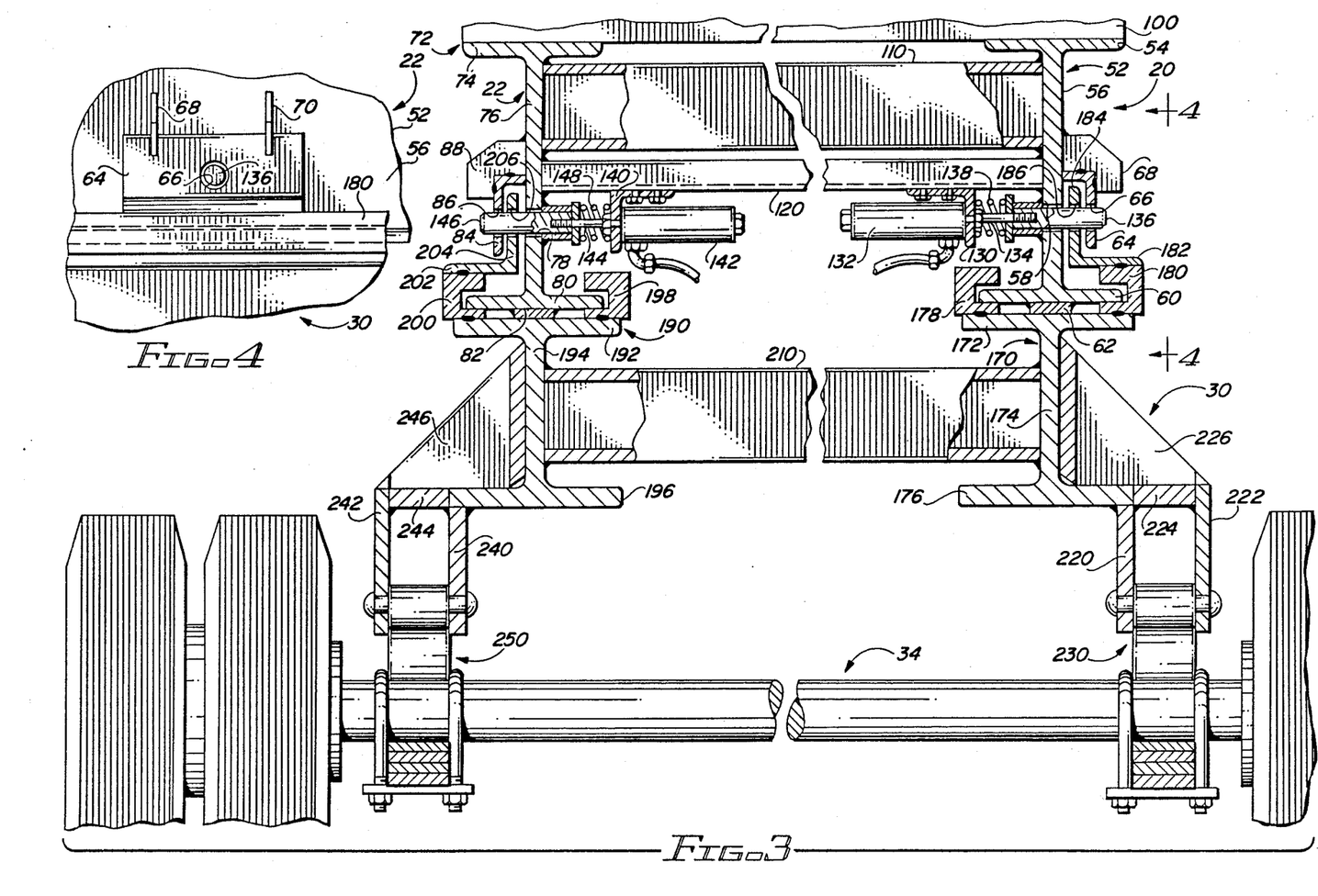
FIG. 3 is a view in partial section of a portion of the apparatus of the present invention taken generally along line 3—3 of FIG. 1A.
FIG. 4 is a view taken generally along line 4—4 of FIG. 3.
Figure 5:
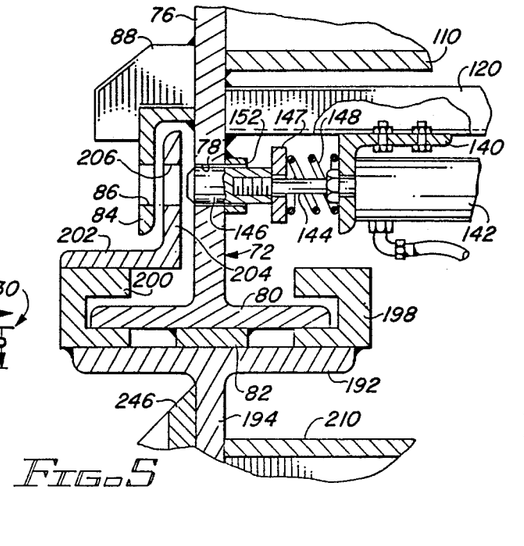
FIG. 5 is an enlarged view of a portion of the apparatus of FIG. 3.

FIG. 3 is a view in partial section taken generally along line 3—3 of FIG. 1A, showing generally the structure of the fixed frame 22 of the trailer apparatus 20, and the sliding frame 30, and including the wheel and axle assembly 34. FIG. 4 is a side view of locking elements involved in locking together the sliding frame 30 and the fixed frame 22 together, taken generally along line 4—4 of FIG. 3. FIG. 5 is an enlarged view of a portion of the locking apparatus of FIGS. 3 and 4, showing the locking elements in their unlocked state. For the following discussion, reference will primarily be made to FIGS. 3, 4, and 5.

The fixed frame assembly 22 includes a pair of generally parallel I beam elements 52 and 72. The I beam elements extend longitudinally of the frame assembly 22.

I beam 52 includes a top flange 54, a web 56, and a bottom flange 60. An aperture or hole 58 extends through the web 56. The aperture 58 receives a lock pin 136 for locking the fixed frame assembly 22 and the movable frame assembly 30 together.

A slide bar 62 is appropriately secured, as by welding, beneath the bottom flange 60, and generally parallel to the web 56.

A lock bracket 64 is secured to the web 56. The lock bracket 64 includes an aperture 66 which is appropriately aligned with the lock aperture 58 of the web 56. A pair of reinforcing ribs 68 and 70 (see FIG. 4) are appropriately secured to the bracket 64 and to the web 56.

The lock bracket 64 simply comprises a relatively short angle iron section. The reinforcing ribs 68, 70 are used simply to help hold the lock bracket 64 onto the web 56 for locking purposes.

The I beam 72 includes a top flange 74 and a bottom flange 80, with a web 76 extending between the flanges 74 and 80. The web 76 includes an aperture or hole 78 extending through it.

A slide bar 82 is appropriately secured, as by welding, to the bottom of the flange 80. The slide bar 82 extends generally parallel to the web 76 of the I beam 72.

A lock bracket 84, which is, like the lock bracket 64, an angle iron section, is appropriately secured to the web 76. An aperture 86 extends through the lock bracket 84. The aperture 86 is aligned with the aperture 78 in the web 76. A pair of reinforcing ribs, of which a rib 88 is shown in FIG. 3, are used to help secure the lock bracket 84 to the web 76.

A bed or platform 100 is shown in FIG. 3 extending across and secured to the flanges 54 and 74 of the I beams 52 and 72, respectively. The load 40 is in turn appropriately secured to the platform or bed 100. See FIGS. 1A, 1B, and 2A, 2B.

An I beam, or H beam, or square tube (as appropriate or as desired) cross brace 110 extends between the webs 56 and 76. The cross brace 110 is one of several substantially identical cross braces. The cross braces are generally parallel to each other and extend in a spaced-apart relationship along the I beams 52 and 72.

A channel iron 120 also extends between the webs 56 and 76. The channel iron 120 simply comprises a base element to which a pair of locking pin assemblies are secured.

A bracket 130 is appropriately secured to the channel or base 120 adjacent to the I beam 52. The bracket 130 supports an air or pneumatic cylinder 132. The air cylinder 132 includes a movable piston rod 134. A pin 136 is secured to the rod 134. The pin 136 is shown in FIG. 3 extending through an aperture or hole 58 in the web 56 and through an aligned aperture or hole 66 in a bracket 64.

A compression spring 138 extends between the bracket 130 and the pin 136. The compression spring 138 urges the pin 136 into the aligned apertures 58 and 66, and through an aligned aperture or hole 186 in a plate or leg 184 secured to the movable frame assembly 30, as will be discussed in detail below, for locking the movable frame assembly 30 to the fixed frame assembly 22.

A bracket 140 is also appropriately secured to the channel 120 on the opposite side of the channel and adjacent to the I beam 72. An air or pneumatic cylinder 142 is then appropriately secured to the bracket 140. The air cylinder 142 includes a rod 144, and a pin 146 is secured to the rod 144. A compression spring 148 extends between the pin 146 and the bracket 140 to urge the pin 146 through a pair of aligned apertures 78 and 86, and through an aligned aperture or hole 206 in a plate or leg 204 secured to the movable frame assembly 30, as will be discussed below, for also securing the fixed frame assembly 22 and the movable frame assembly 30 together.

The movable frame assembly 30 preferably includes a pair of beams, either I beams or H beams, such as an H beam 170 and an H beam 190. The beams 170 and 190 are vertically aligned with the I beams 52 and 72 of the fixed frame assembly 22, respectively.

The beam 170 includes a top flange 172, a bottom flange 176, and a web 174 extending between the flanges 172 and 176. A generally U-shaped slide element or channel 178 is appropriately secured, as by welding, to the flange 172. The slide element 178 receives and slides on a portion of the flange 60 of the beam 52.

A second generally U-shaped slide element or channel 180 is also secured to the flange 172. The slide element 180 also receives and slides on a portion of the flange 60. The outer portions of the flange 60 extend into the slide elements 178 and 180, and the slide bar 62 is disposed on the center of the flange 172, generally aligned with the web 174 of the beam 170 and also with the web 56 of the beam 52. Thus, sliding action or relative movement between the fixed frame 22 and the movable frame 30 occurs as portions of the flanges 60 move in the slide elements 178 and 180 and as the slide bar 62 moves on the top of the flange 172.

The slide elements or channels 178 and 180 extend substantially the entire length of the beam 170. Similarly, the slide bar 62 extends substantially the entire length of the beam 170. The three elements, the slide bar 62 and the slide channels 178 and 180 comprise, with the corresponding portions of the flanges 172 and 60, respectively, the sliding contact portions of the beams 52 and 170.

An angle bracket is appropriately secured, as by welding, to the slide element 180. The angle bracket includes a horizontal arm 182 and a vertical arm 184. The angle bracket arm 182 is secured to the slide element 180, while the vertical arm 184 is disposed between the web 56 of the beam 52 and the lock bracket 64.

The vertical web 184 includes the aperture or hole 186 referred to above. The aperture or hole 186 is aligned with the apertures or holes 58 and 66 in the web 56 and the bracket 64, respectively, to receive the lock pin 136 to help secure or to help lock the frame assemblies 22 and 30 together. The lock pin 136 is shown in FIG. 3 extending through the three aligned holes 58, 186, and 66.

The beam 190 includes a top flange 192, a bottom flange 196, and a central web 194 extending between and secured to the flanges 192 and 196. A U-shaped slide element or channel 198 is appropriately secured to the top flange 192. A second U-shaped slide element or channel 200 is also secured to the flange 192. The slide elements 198 and 200 receive portions of the lower flange 80 of the beam 72. The slide bar 82 is secured, as by welding, to the bottom of the flange 80, disposed on the top of the flange 192, and is generally aligned with the webs 194 and 76. The slide elements or channels 198 and 200 and the slide bar 82 extend generally the entire length of the beam 190. The three elements, the slide bar 82 and the channels 198 and 200, comprise, with the corresponding portions of the flanges 192 and 80, respectively, the sliding contact part of the beams 72 and 190.

A horizontal arm 202 of an angle bracket is secured to the slide element 200. A vertical arm 204 extends upwardly from the horizontal arm 202 between the web 76 of the beam 72 and the lock bracket 84. The vertical arm 204 includes an aperture 206 which is appropriately aligned with the apertures 78 and 86 to receive the pin 146 to lock the fixed frame assembly 22 and the movable frame assembly 30 together.

As best shown in FIG. 5, a guide sleeve 152 is disposed about the aperture 78 of the web 76. The guide sleeve 152 is appropriately secured to the web 76. The guide sleeve 152 guides the pin 146 as it moves in response to either the biasing force of the spring 148 or the air pressure from the cylinder 142 when the pin 146 is retracted.

A plate 147 is secured to the pin 146. The compression spring 148 extends between the plate 147 and the bracket 140 to urge the pin 146 into locking engagement through the aligned apertures 78, 206, and 86 to secure the fixed frame 22 and the movable frame 30 together. In FIG. 5, the pin 146 is shown retracted, thus unlocking the fixed frame 22 and the movable frame 30.

It will be noted that the lock pin 136 (See FIG. 3) also utilizes a sleeve and a plate, substantially the same as discussed above in conjunction with the pin 146 and its related elements, shown in both FIGS. 3 and 5.

It will be further noted that the air cylinders 132 and 142 are pressurized only for purposes of retracting the locking pins 136 and 146 out of locking engagement so that the movable frame and the fixed frame are able to move relative to each other. When pressure is removed from the cylinders 132 and 142, the compression springs 138 and 148 bias the respective locking pins into locking engagement, as discussed above.

Extending between the webs 174 and 194 of the beams 170 and 190, respectively, is a cross brace 210. The cross brace 210, like the cross brace 110, provides lateral stability, with the cross brace 210 providing lateral stability for the movable frame apparatus 30. There are, obviously, a plurality of cross braces 210 extending generally parallel to each other and spaced apart along the longitudinal length of the beams 170 and 190 for the movable frame 30 and a similar plurality for the beams 52 and 72 for the fixed frame 22.

A plate 220 extends downwardly from the flange 176 of the beam 170, as best shown in FIG. 3. A second plate 222 is disposed generally parallel to the plate 220. A plate 224 extends outwardly from the flange 176, and it essentially comprises an outward extension of the flange 176. The plates 220 and 222 are both secured to the plate 224.

A gusset 226, which simply comprises a triangular section of an I beam or an H beam, is secured to the web 174 and flange 176 of the beam 170 and the plates 222 and 224.

The plates 220 and 222 are generally parallel to each other, and they comprise a pair of shackle elements to which a spring assembly 230 is secured.

A plate 240 extends downwardly from the outer portion of the flange 196. A second plate 242 is disposed generally parallel to the plate 240 and is secured to a horizontal plate 244. The plate 244 comprises an outward extension of the flange 196, and is appropriately secured to both the flange 196 and the plate 240.

A gusset 246, which is substantially identical to the gusset 226, is appropriately secured to the web 194, the flange 196, the plate 244, and the plate 242.

The plates 240 and 242 comprises a pair of shackle elements or plates to which a spring assembly 250 is secured. The wheel and axle assembly 34 is then appropriately secured to the spring assemblies 230 and 250.

Figures 9, 10A, 10B, 11, 13:
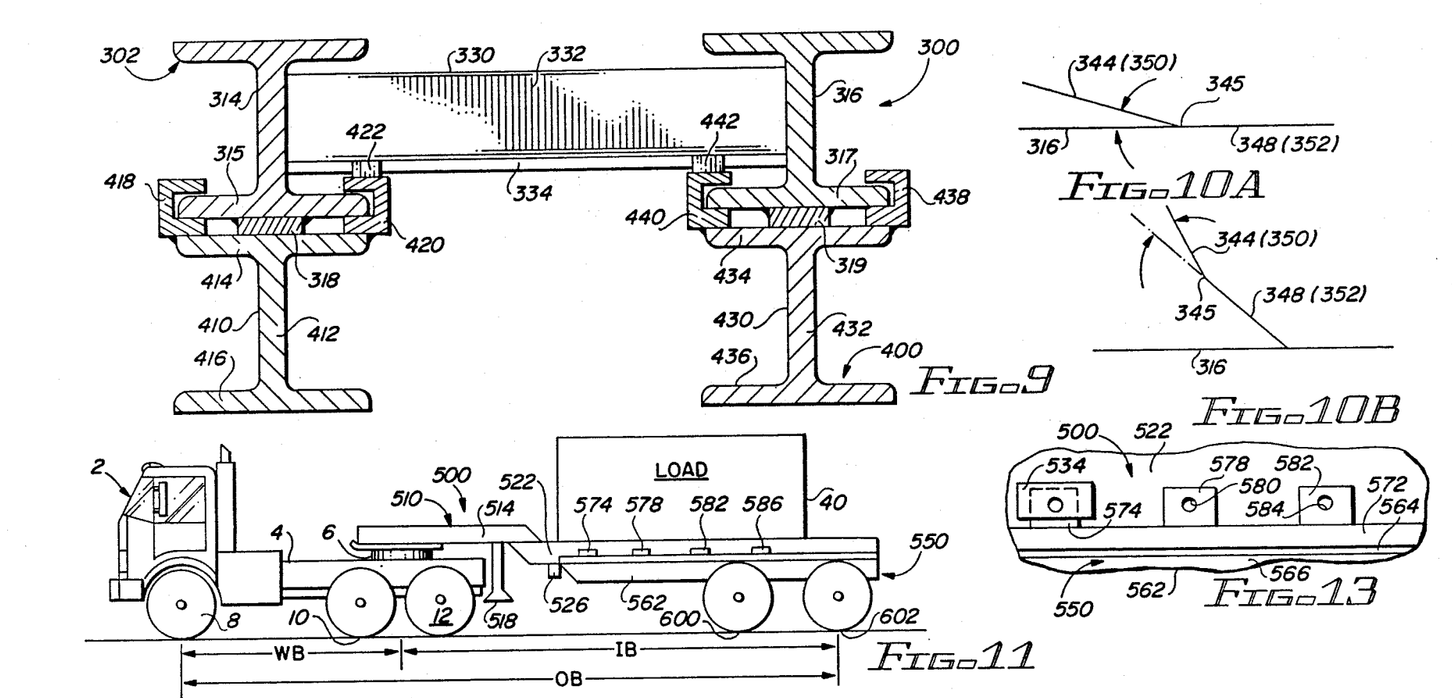
FIG. 9 is a view in partial section taken generally along line 9—9 of FIG. 7.
FIG. 10A is a schematic representation of the dump apparatus of FIGS. 6 and 7.
FIG. 10B is a schematic representation of the dump apparatus of FIGS. 6 and 7 sequentially following FIG. 10A.
FIG. 11 is a side view of the apparatus of the present invention schematically illustrating various features.
FIG. 13 is an enlarged fragmentary view of a portion of the apparatus of FIG. 11.

The trailer apparatus 20 of FIGS. 1A, 1B, 2A, 2B, and 3, 4, and 5 comprises a flat bed version of trailer apparatus which includes a fixed frame and a movable frame. For moving the two frames relative to each other, brakes (not shown) are actuated to lock the wheels of the movable frame assembly 30. The tractor 2 is then moved until stop elements are engaged. There are stop elements for limiting the relative movement in both the closed position of the trailer apparatus, as shown in FIGS. 1A and 2A, and also for limiting the movement of the fixed and movable frame assemblies in the open position. The stop assembly for limiting the open position is shown in FIG. 9. The movable and fixed frames may also be locked in intermediate positions, as shown in FIG. 13, and as will be discussed below in conjunction therewith.

In FIGS. 1A and 1B, a front stop element 160 is shown secured to the fixed frame 22. In actuality, two stop elements are preferably utilized, the stop element or block 160 secured to the beam 72 and a parallel element or block (not shown) secured to the beam 52.

When the movable frame 30 contacts the stop block(s) 160, the two frames are in their closed position, and the pins 136 and 146 are appropriately aligned the holes 186 and 206 in the vertical arms 184 and 204, respectively on the movable frame 30, for securing the two frames together. From the open position of the trailer apparatus, brakes (not shown) on the movable frame assembly 30 are actuated to hold the frame 30 in position. The tractor 2 then moves rearwardly, and the fixed frame assembly 22 moves rearwardly with the tractor until the stop block(s) 160 contacts the frame 30. The lock pins 136 and 146 then extend appropriately through the aligned holes, as discussed above, to lock the frames 22 and 30 together in the closed position of the trailer apparatus 20.

For extending the frames 22 and 30, and thus to "open" the trailer apparatus 20, or to move the trailer apparatus 20 to its open position, the brakes on the frame 30 are again set, and the pneumatic or air cylinders 132 and 142 are actuated to withdraw the pins 136 and 146 from the arms 184 and 204 to unlock the frames 22 and 30. The tractor 2, with the fixed frame 22, is then moved forwardly the desired distance.

Figure 12:
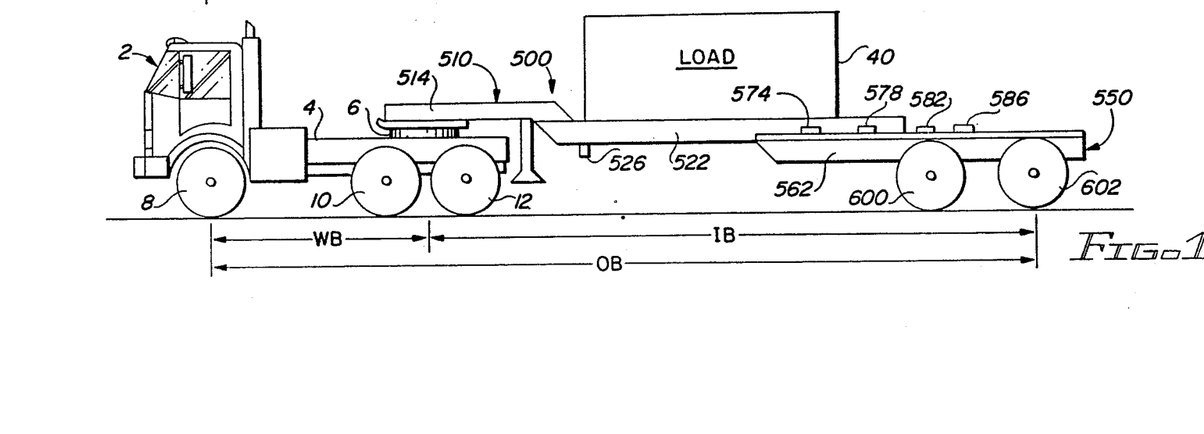
FIG. 12 is a schematic representation of the side view of the apparatus of the present invention with the trailer apparatus extended.

In addition to the rear lock brackets with the vertical arms 184 and 204 and their apertures 186 and 206 for receiving the lock pins 136 and 146 to lock the trailer 20 in the closed position, the movable frame 30 also includes a pair of front lock angle brackets with vertical arms and apertures for receiving the lock pins 136 and 146 to lock the trailer 20 in the open position. A vertical arm 164 is shown in FIGS. 1A and 1B secured generally at the front portion of the movable frame 30. In addition to front and rear lock brackets on a movable frame, several intermediate brackets are illustrated in FIGS. 11, 12, and 13 and are discussed in conjunction therewith.

Rear stop elements or block (not shown) are used to stop the relative movement of the fixed and movable frame assemblies 22 and 30, respectively, as the frames open or extend. When extended or opened, and when the rear stop element or block is contacted, the lock pins 136 and 146 are appropriately indexed adjacent to the respective apertures in the vertical lock webs on the frame assembly 30. The lock web or plate 164 is shown in FIG. 1B adjacent to the lock bracket 84 for receiving the lock pin 146. While the rear stop blocks for the trailer apparatus 20 are not illustrated, stop brackets for the trailer apparatus 300 are shown in FIG. 9 and discussed in conjunction therewith.

Figure 6:
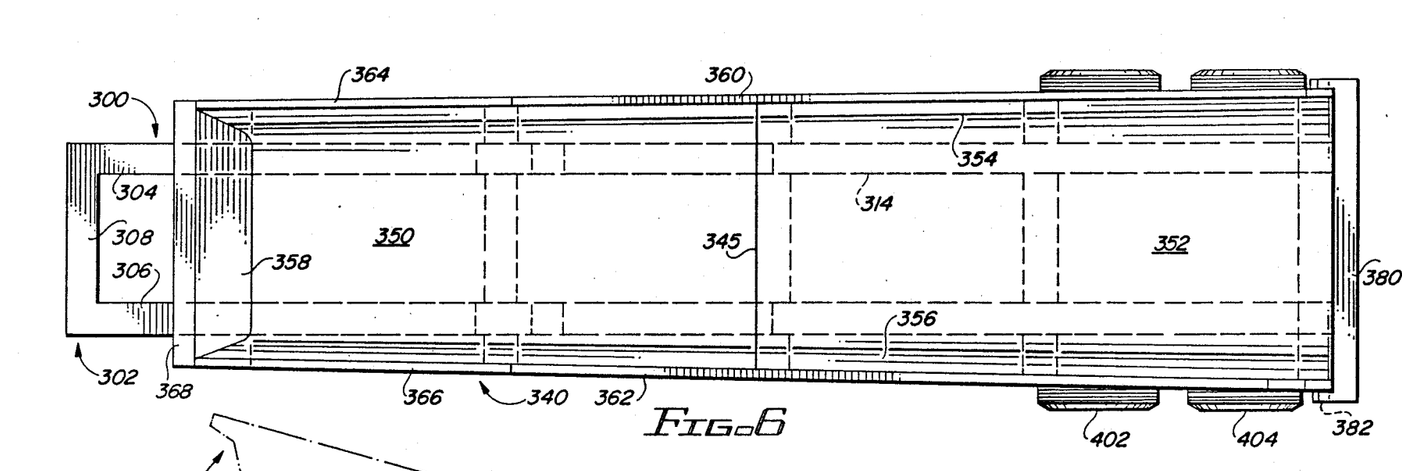
FIG. 6 is a top view of a portion of the apparatus of the present invention.

FIG. 6 is a top view of an end dump or dump truck trailer embodiment 300. The trailer apparatus 300 utilizes a fixed frame 302 and a movable frame 400. The movable frame 400 is substantially identical to the movable frame 30 discussed above. However, as illustrated in FIGS. 6 and 7, only a pair of wheel and axle assemblies are shown, instead of the three wheel and axle assembles illustrated in FIGS. 1A, 1B, 2A, and 2B.

Figure 7:
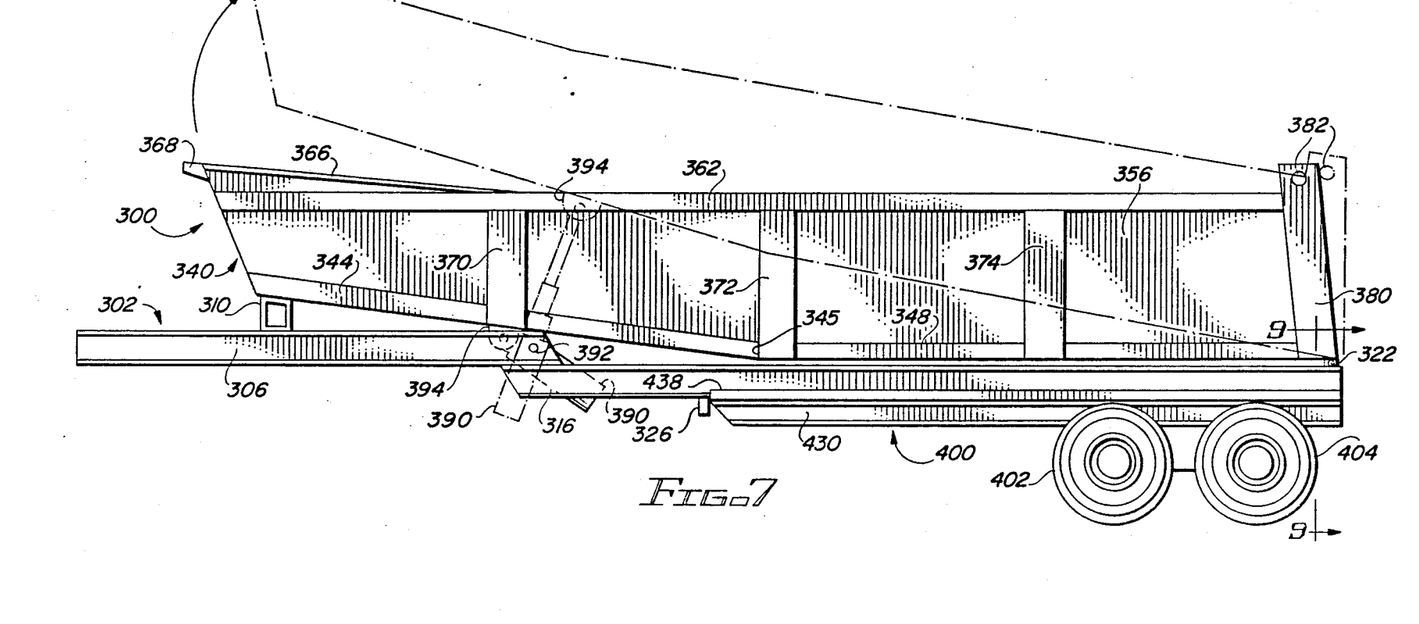
FIG. 7 is a side view of the apparatus of FIG. 6.
Figure 8:
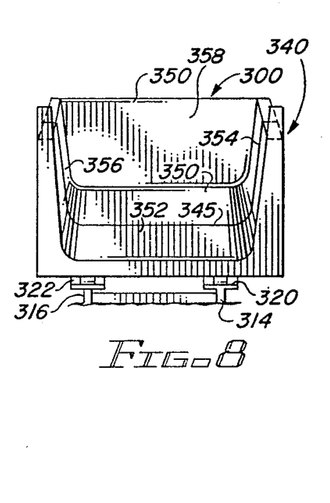
FIG. 8 is a rear end view of the apparatus of FIGS. 6 and 7.

FIG. 7 is a side view of the dump truck trailer embodiment 300. FIG. 8 is a rear view of a portion of the trailer apparatus 300 of FIGS. 6 and 7. FIG. 9 is a view in partial section taken generally along line 9—9 of FIG. 7. For the following discussion, reference will primarily be made to FIGS. 6, 7, 8, and 9.

The trailer apparatus 300 includes a dump bed 340 disposed on a fixed frame 302. The fixed frame 302 includes a pair of generally parallel front I-beam or H-beam elements 304 and 306. A cross beam 308 is shown in FIG. 6 extending between, and appropriately secured to, the beams 304 and 306. For securing the trailer apparatus 300 to a tractor, such as the tractor 2, a trailer hitch king pin (not shown) is appropriately secured, as by welding, to a plate (not shown), and the plate is in turn appropriately secured, again as by welding, to the frame members 304, 306, and 308. These elements are, of course, well known and understood in the art.

As may best be understood from FIG. 7, the beams 304 and 306 are front upper beams, and they are appropriately disposed above, and secured to, a pair of lower beams 314 and 316. The beams 304 and 314 are aligned with each other and the beams 306 and 316 are appropriately aligned with each other. Also, the respective beam pairs 304, 314 and 306, 316 are appropriately secured together as by welding. In addition, structural cross beams or cross members extend between the longitudinally extending beam pairs 304, 314 and 306, 316.

A cross beam 310 is shown in FIG. 7 disposed on the beam 306 (and also on the beam 304). The cross beam 310 is secured to the bed 340 and is utilized as a front support for the dump bed 340.

The dump bed 340 includes a pair of longitudinally extending front lower sloping frame members, of which a frame member 344 is shown in FIG. 7. The dump bed 340 also includes a pair of longitudinally extending lower rear frame members, of which a rear frame member 348 is shown in FIG. 7. The longitudinal frame members of the dump bed 340 are appropriately aligned with the longitudinally extending frame members 304, 314 and 306, 316.

As best shown in FIGS. 7, 10A, and 10B, the front longitudinally extending frame members, including the member 344, are disposed at an acute angle of about fourteen or fifteen degrees with respect to the rear frame members. The rear frame member 348, and its parallel companion are generally horizontally extending, while the front frame members, such as the front frame member 344, extends upwardly at an angle from the horizontal of about fourteen or fifteen degrees or so to provide a positive tilt to the front end or front portion of the dump bed 340.

Within the dump bed 340 is a front sloping bed 350 and a rear horizontal bed 352. A line 345, aligned with the juncture of the frame members 344 and 348, and their parallel companions, divides the sloping front bed portion 350 from the horizontal rear bed portion 352. The rear horizontal bed 352 is disposed on and secured to the rear longitudinally extending frame member 348 and its parallel companion (not shown), and the front sloping bed 350 is disposed on and secured to the upwardly extending front longitudinally extending frame members (such as member 344) and its parallel companion (not shown).

As best shown in FIG. 6, and as may also be understood from FIG. 8, the dump bed 340 includes inwardly tapering sides, including a side 354 and a side 356. The sides 354 and 356 are appropriately secured to the bed 350 and to the bed 352, and curve upwardly and outwardly from the bed bottom portions 350 and 352, and taper inwardly from the rear of the dump bed 340 to a front panel or side 358. The front side 358 is also sloping, as clearly shown in FIG. 6, and as may also be understood from FIG. 7.

There are upper frame structural members at the top of the sides 354, 356, and 358. They include an upper frame member 360 and an upper frame member 362. To provide for the increased height at the front of the dump bed 340, there is a front upper frame member 364 and an front upper frame member 366. There is also a front upper cross member 368 extending between and secured to the front upper frame members 364 and 366 and the front side 358.

Side reinforcing elements 370, 372 and 374 are shown in FIG. 7. The side portion reinforcing elements 370, 372, and 374 reinforce the side 356, and it will be understood that similar reinforcing elements reinforce the side 354. Moreover, bottom reinforcing elements (not shown), aligned with and extending between the side reinforcing elements, reinforce the bottom or bed portions 350 and 352.

A tailgate 380 is secured to the sides 354 and 356 by appropriate hinge elements, such as a hinge 382. As best shown in FIG. 7, the tailgate 380 is sloping to provide a positive closure of the tailgate when the dump bed 340 is in its down position, as shown in FIG. 7.

The dump bed 340, as best shown in FIG. 8, is secured to the longitudinally extending beams 314 and 316 by a pair of hinge assemblies 320 and 322, respectively.

The dump bed 340 pivots on the hinges 320 and 322 in response to a hydraulic cylinder 390. The hydraulic cylinder 390 is appropriately secured to and pivots on a trunnion or yoke element 392 on the frame 302 and on a pivot 394 secured to appropriate structure members of the forward portion 350 of the dump bed 340.

In operation, the inwardly tapering sides, together with the sloping front bed portion 350, allow the dump bed 340 to dump material conveniently and with less of a vertical rise than contemporary dump beds. The taper of the sides also encourages or enhances the flow of the material out of the dump bed 340.

FIGS. 10A and 10B are schematic representations of the bed 340 illustrating the effects of the sloping bed portions 350 and 352, as represented by the structural members 316, 344 and 348. For the following discussion, reference will be made primarily to FIGS. 10A and 10B and FIG. 7.

As discussed above, the bed 350, secured to frame members 344 and its parallel companion, is disposed upwardly from the frame member 348 and its parallel companion at an acute angle of about fourteen or fifteen degrees. The line 345 is the break line or angular demarcation line between the two bed portions 350 and 352. Generally, with the bed 340 in the down position, the rear bed portion 352 is parallel to frame member 316 and its parallel companion member 314 and they are generally horizontal.

As the bed 340 rises under the extension of the cylinder or actuator 390, the front sloping bed portion 350, aligned with the member 344, is always at a greater angle than the rear bed portion 352. Accordingly, the material on the front bed portion 350 will exert a force on the material on the rear bed portions 352 greater than that which would be expected and encountered on a "contemporary" flat dump bed.

It is "standard" to extend the dump bed to an angle of about forty-five degrees. As shown in FIG. 10B, when the rear or "flat" bed portion 352 is pivoted or elevated to about forty-five degrees, the front sloping bed portion 350 is at an angle substantially in excess of forty-five, namely at about sixty or so degree angle. Or, in the alternative, if the sloping front bed portion 350 is pivoted to about forty-five degrees, the rear flat bed portion 352 is at an angle of about fifteen degrees less, or about thirty degrees. Obviously, with the sloping front portion, the dumping of the bed 340 will begin at a lower dump angle than with a "contemporary" flat dump bed. Moreover, with the combination of sloping bottom and outwardly tapered sides, the dumping is faster and more efficient than with contemporary dump bed designs.

The movable frame apparatus 400 is substantially identical to the movable frame apparatus 30. Similarly, the fixed frame assembly 302, and its frame elements or members, and the elements associated with the locking, unlocking and the movement of the movable frame assembly 400 relative to the fixed frame assembly 302, are substantially identical to the fixed frame assembly 22 also discussed above. Accordingly, the elements need not be rediscussed. The locking elements, stop blocks, and related elements have been omitted from FIGS. 6 and 7, but have been discussed above in detail in conjunction with the apparatus 20 and the frame assemblies 22 and 30, which are substantially identical with respect to the corresponding parts or elements.

The principal of operation of the fixed frame assembly 302 and the movable frame assembly 400 of the trailer 300 is, in theory and in operation, substantially identical to that discussed above for the trailer apparatus 20. For purposes of loading and unloading (dumping) the dump bed 340, the movable frame assembly 400 is in its closed position with respect to the fixed frame 302. This is as shown in FIGS. 6 and 7. For purposes of transport, the movable frame apparatus 400 is moved rearwardly to provide better weight distribution among the wheel and axle assemblies of the pulling tractor, such as the tractor 2 discussed above, and wheel and axle assemblies 402 and 404 of the movable frame assembly 400.

FIG. 9 is a view in partial section taken generally along line 9—9 of FIG. 7. FIG. 9 discloses the rear stop elements for limiting the outward movement of the movable frame assembly 400 relative to the fixed frame assembly 302. For the following discussion, reference will primarily be made to FIGS. 7 and 9.

The fixed frame assembly 302 includes a longitudinally extending beam 316, which is preferably an H-beam, with relatively wide upper and lower flanges. Generally parallel to the beam 316 is a beam 314. The beams 314 and 316 are substantially identical to each other. As shown in FIG. 7, the beams 316 is appropriately secured to the beam 306. The beam 314 is appropriately secured to the beam 304.

The movable frame assembly 400 includes a pair of parallel H-beams, vertically aligned with the beams 314 and 316. In FIG. 7, a beam 430 is shown disposed beneath the beam 316. In FIG. 9, the beam 430 is also shown disposed beneath the beam 316. FIG. 9 also discloses a beam 410 disposed beneath the beam 314.

Extending between the vertical flanges of the upper, fixed beams 314 and 316 is an angle iron cross member 330. The angle iron cross member 330 includes a vertical leg 332 and a horizontal leg 334.

The beam 314 includes a lower flange 315, and the beam 316 includes a lower flange 317. The beam 410 includes a vertical web 412, an upper flange 414, and a lower flange 416. The flanges 414 and 315 are generally aligned parallel to each other.

The beam 430 includes a vertical web 432, an upper flange 434, and a lower flange 436. The lower flange 317 of the beam 316 is generally parallel to the upper flange 434 of the lower beam 430.

A pair of slider channels 418 and 420 are appropriately secured to the outer portions of the upper horizontal web 414 of the beam 410. A similar pair of channels 438 and 440 are secured to the upper flange 434 of the beam 430.

A slide bar 318 is appropriately secured to the bottom of the horizontal flange 315 of the beam 314. A similar slide bar 319 is secured to the bottom of the horizontal web 317 of the beam 316. The slide bars 318 and 319 are disposed on, and movable relative to, the top surface of the upper flanges 414 and 434 of the lower beams 410 and 430, respectively, of the movable frame 400.

The slider channel elements 418 and 420 receive the outer portions of the lower flange 315 of the beam 314. The slider channels 440 and 438 receive the outer portions of the lower horizontal flange 317 of the beam 316. As with the movable frame assembly 30, and as best shown in FIG. 7 for the movable frame assembly 400, the slider channel elements (of which only the slide channel 438 is shown in FIG. 7) extend substantially the full length of the beams 410 and 430. By reference to FIGS. 3, 4, and 9, it will be understood that the slider channel elements, together with the flanges which they enclose or receive, and with the upper flanges to which they are secured, comprise or defined relatively enclosed slider areas. The enclosure or enclosed slider areas provide several functions. The first function is to enclose the relatively movable parts to help prevent various types of debris from entering into the area. The relatively movable elements thus are somewhat protected from elements which otherwise may hamper the sliding ability between the relatively movable elements.

Another function contributed by the full length channel is to comprise an enclosure for receiving lubricating elements and cleaning elements. It has been found that the best lubricant and cleaning solution for the sliding apparatus is a liquid detergent. The liquid detergent is, of course, water soluble, and simply using water spray cleans out the relatively movable parts. At the same time, the detergent does not attract and hold sand, dirt, dust, etc., like petroleum based oils or lubricating products typically do. Moreover, liquid detergent is relatively inexpensive, is readily available, and is typically biodegradable. The use of such liquid detergents does no harm to the environment when it is washed out, and on the other hand it does a relatively good job of decreasing the friction while the movable frame assembly and the fixed frame assembly are moved relative to each other. Thus, the slider channels, and the fixed beam flanges, whose outer portions they receive, and the flanges to which they are secured, provide enclosures or enclosed area for maintaining the relatively movable elements in a relatively clean environment and they enclose or contain the lubricating material.

Referring now primarily to FIG. 9, a pair of stop blocks is secured to the upper portions of the slide channels 420 and 440. A stop block 422 is secured to the top or upper surface of the slide channel 420, and a stop block 442 is appropriately secured to the upper portion of the slide channel 440. The stop blocks 422 and 442 are aligned with the horizontal leg 334 of the angle iron 330. Thus, the angle iron 330, or its horizontal leg 334, and the stop blocks 422 and 442 comprise stopped elements for stopping the rearward movement of the movable frame assembly 400 relative to the fixed frame assembly 302.

As also best shown in FIG. 9, the bottom surface of the horizontal leg 334 of the angle iron 330 is disposed a relatively short distance above the top or upper surface of the slide channel elements 420 and 440. The clearance between the upper surface of the slide channel elements 420 and 440 and the bottom surface of the horizontal leg 334 of the angle iron 330 is typically only about a quarter of an inch or so. The clearance allows the free relative movement between the fixed frame assembly 302 and the movable frame assembly 400, but also allows the use of stop blocks which are extending upwardly only a relatively short distance above the slide channel elements to which they are appropriately secured.

Referring again to FIG. 7, a front stop block 326 is shown extending beneath the beam 316 of the fixed frame assembly 302. The front portion of the beam 430 of the movable frame assembly 400 is shown disposed against the stop block 326. There is another stop block secured to the beam 314, generally parallel to the stop block 326. The stop block secured to the beam 314 is not shown. However, it will be understood that each of the beams 314 and 316 includes a stop block extending downwardly from the beam. The beams 410 and 430 of the movable frame assembly 400 make contact with the stop blocks to limit the forward movement of the movable frame assembly 400 with respect to the fixed frame assembly 302.

FIG. 11 is a schematic representation of the tractor 2 secured to a trailer 500. The trailer 500 includes a fixed frame assembly 510 and a movable frame assembly 550. The load 40, illustrated above in FIGS. 1A, 1B, and 2A, 2B is illustratively disposed on the fixed frame 510 of the trailer 500.

In FIG. 11, the trailer 500 is shown in its closed position, or its shortened position, with the movable frame assembly 550 nested on the fixed frame assembly 510. In FIG. 12, the movable frame assembly 550 is shown in its open position, with the trailer 500 extended for maximum overall length to allow the tractor 2 and the trailer 500 to gross out at maximum weight and the comply with the appropriate federal bridging laws for the maximum gross weight.

The effect of the bridge laws with respect to the tractor 2 and trailer 500 are illustrated in FIGS. 11 and 12. The wheel base for the tractor 2 comprises the distance between the axle of the front wheel assembly 8 and an intermediate point between the rear wheel and axle assemblies 10 and 12. The wheel base for the tractor 2 is accordingly fixed.

Secured to the movable frame assembly 550 are two wheel and axle assemblies, including a wheel and axle assembly 600 and a wheel and axle assembly 602. The wheel and axle assembly 600 is the "front" wheel and axle assembly, and the wheel and axle assembly 602 is the "rear" wheel and axle assembly for the movable frame assembly 550.

In FIG. 11, with the trailer 500 shown in its shortened configuration, with the movable frame assembly 550 nested against the fixed frame assembly 510, the inner bridge of the tractor and trailer combination is the distance between the rear wheel and axle assembly 602 and the point halfway between the wheel and axle assemblies 10 and 12 of the tractor 2. The outer bridge is the distance between the axle of the front wheel and axle assembly 8 and the axle of the rear wheel and axle assembly 602.

It is obvious, from comparing the inner bridge and outer bridge distances in FIG. 11 with the corresponding inner and outer bridges of FIG. 12, that the inner and outer bridges of FIG. 12 are substantially longer than those of FIG. 11.

In FIG. 12, the movable frame assembly 550 is shown open or moved outwardly from the fixed frame assembly 510. This substantially lengthen both the inner bridge and the outer bridge of the tractor 2 and trailer assembly 500.

Under contemporary bridging laws, established by the National Transportation Safety Board of the Department of Transportation, in order for a tractor trailer rig to gross at a maximum of 80,000 pounds, the inner bridge must be a minimum of thirty-six feet, and the outer bridge must have a minimum length of fifty-one feet. By extending the movable frame assembly 550 outwardly, the minimum length bridge requirements are met with the trailer 500 secured to the tractor 2. However, for loading and for maneuvering, it is obvious that the shorter inner and outer bridges are highly desirable. Accordingly, the movable frame assembly 550 is moved inwardly to nest against the fixed frame assembly 510, as illustrated in FIG. 11, for loading purposes, and for maneuvering purposes, as in loading dock areas, etc. Then, for transporting on roads, the movable frame assembly 550 is moved rearwardly to extend the overall length of the trailer 500 and thus to comply with the appropriate bridge laws for maximum gross weight of the tractor and trailer rig.

It will be noted, as shown in FIG. 12, that the axle for the front wheel and axle assembly 600 of the movable frame 550 is disposed rearwardly from the rear end or outer end of the fixed frame 510. This will be discussed in more detail below.

The fixed frame assembly 510 includes an upper front beam 514 and a lower rear beam 522. The beams 514 and 522 are appropriately secured together, as by welding, as discussed above in conjunction with the trailer apparatus 20 and the trailer apparatus 300. The beams 514 and 522 are the left side beams, and naturally there are parallel right side beams, with appropriate cross members between the beams. A stop block 526 is shown disposed beneath the front portion of the lower rear beam 522. The stop block 526 acts as a forward stop to limit the forward or closed position or movement of the movable frame assembly 550.

A pair of support legs, including a support leg 518, is secured to the front portion of the fixed frame assembly 510. The support leg 518 is telescoping, and extends downwardly to support the front portion of the trailer 500 when the trailer 500 is disconnected from the tractor 2.

The movable frame assembly 550 includes a pair of parallel beams which are disposed beneath the lower fixed beams of the fixed frame 510. In FIGS. 11 and 12, a beam 562 is shown disposed beneath the beam 522. The beam 562 is a left beam, and there is a parallel right beam, not shown, appropriately aligned with the beam 562 and disposed on the opposite side of the trailer 500, substantially the same as illustrated above in conjunction with the trailer apparatus 20 and 300, and particularly as shown in FIGS. 3, 5, and 9.

FIG. 13 is an enlarged view of a portion of trailer 500. For the following discussion of details of the movable frame assembly 500 and the fixed frame assembly 510, reference will primarily be made to FIGS. 11, 12, and 13.

The beam 562 includes a top flange 564, a web 566, and a bottom flange (not shown). A slide channel 572 is secured to the top flange 564. The slide channel 572 receives the bottom flange (not shown) of the beam 522. The cooperating arrangement between the beams, the slide channels, slide bars, etc., for the trailer apparatus 500 is substantially the same as generally illustrated in conjunction with the trailer apparatus 20 and the trailer apparatus 300, as best shown in FIGS. 3, 5, and 9. Thus, essentially, the structural elements involved in the fixed frame and the movable frame assemblies are substantially identical in the trailer apparatus illustrated in the drawings.

The fixed frame assembly 510 and the movable frame assembly 550 lock together substantially the same as illustrated above in FIGS. 3 and 5. Spring biased and pneumatically actuated pins extend through aligned apertures in the various webs and flanges to secure the movable frame assembly and the fixed frame assembly together. However, for the trailer apparatus 20 and 300, the movable frame assemblies 30 and 400 illustratively are secured to the fixed frame assemblies 22 and 302 in only two positions, fully open positions and fully closed positions. For the trailer apparatus 500, the movable frame assembly 550 may be secured at any of a plurality of locations. Illustratively, two positions between the inner and outer or open and closed positions are shown.

Appropriately secured to the fixed beam 522 is a lock bracket 534. The lock bracket 534 includes an aperture which is aligned with an aperture in the beam 522. There is also a movable pin assembly, such as the movable pin assemblies illustrated in FIGS. 3 and 5, and as discussed above, for securing the movable frame and fixed frame assemblies together. The movable pin is, of course, aligned with the apertures in the lock bracket 534 and the beam 522.

Secured to, and extending upwardly from, the slide channel 572, is a plurality of lock angle bracket elements, which are angle iron sections, substantially as discussed above, particularly in conjunction with FIGS. 3 and 5. The lock angle irons include vertical legs. Four such vertical legs are shown in FIGS. 11 and 12, and three of the vertical legs are illustrated in FIG. 13.

In FIGS. 11 and 12, four lock brackets are shown, a lock bracket 574, a lock bracket 578, a lock bracket 582, and a lock bracket 586. The lock bracket 586 is the rearmost lock bracket, while the lock bracket 574 is the forward most lock bracket. In FIG. 11, the lock bracket 586 is aligned with the lock bracket 534 of the beam 522 of the fixed frame 510. In FIG. 12, the lock bracket 574 is aligned with the lock bracket 534. The rearmost lock bracket 586 is aligned with the lock bracket 534 when the movable frame assembly 550 is in its closed or nested position. With the movable frame assembly 550 in the open position, the frontmost lock bracket 574 is aligned with the lock bracket 534.

As best shown in FIG. 13, the lock brackets each include an aperture. In FIG. 13, the lock bracket 578 is shown with its aperture 580, and the lock bracket 582 is shown with its aperture 584.

If desired, the movable frame assembly 550 may be positioned at any of four locations on the fixed frame assembly 510. The four positions include the fully open position as shown in FIG. 12, the fully closed position as shown in FIG. 11, or either of the two intermediate positions. In the intermediate positions, either the lock bracket 578 or 582 would be appropriately aligned with the lock bracket 534 to allow a lock pin to engage or to extend through the aligned apertures in the beam 522 and its lock bracket 534 with any of the desired lock brackets on the movable frame assembly 550.

It will be noted that the movable frame assemblies discussed above are all self supporting over their entire lengths. No special clamps, fixtures, or other elements are necessary or are required to support the trailer apparatus in the open, closed, or intermediate positions.

The slider channels, secured to the movable frame assemblies' top flanges, extend substantially the full length of the movable frame assemblies, and cooperate with the fixed frame assemblies to provide the self supporting feature. Moreover, the slider channels also provide increased strengthening of the movable frame assemblies' longitudinally extending beams to which they are secured.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention.

What I claim is:

1. Extendable trailer apparatus, comprising in combination:

first frame means for supporting a load to be hauled having a first overall length, including
bed means on which the load is disposed,
first beam means secured to the bed means for supporting the bed means and the load, and
second beam means spaced apart from and disposed generally parallel to the first beam means and secured to the bed means for supporting the bed means and the load with the first beam means;

second frame means movable relative to the first frame means between an open and a closed position, including
third beam means having a first full length and disposed adjacent to the first beam means for movement relative to the first beam means,
fourth beam means having a second full length and disposed adjacent to the second beam means for movement relative to the second beam means,
slider means secured to the third and fourth beam means and extending substantially the first and second full lengths of the third and fourth beam means for guiding the first and third beam means and the second and fourth beam means as the third and fourth beam means move relative to the first and second beam means and on which the first and second beam means are disposed, wherein the first frame means further includes first slide bar means secured to the first and second beam means and slidable on the third and fourth beam means as the first and second frame means move relative to each other between the open and closed positions and the first and third beam means includes webs with which the first slide bar means is aligned, and
wheel and axle means operatively secured to the third and fourth beam means for supporting the first and second frame means; and locking means for securing the first and second frame means together.

2. The apparatus of claim 1 in which the first frame means includes stop means for stopping the relative movement of the first and second frame means in the open and closed positions.

3. The apparatus of claim 1 in which the first and second beam means each include respectively a first flange and a second flange, and the third and fourth beam means each include respectively a third flange and a fourth flange disposed respectively adjacent to the first and second flanges.

4. The apparatus of claim 3 in which the first slide bar means secured to the first and second beam means includes a first slide bar secured to the first flange, and slidable on the third flange, and a second slide bar secured to the second flange and slidable on the fourth flange.

5. The apparatus of claim 4 in which the slider means of the second frame means further includes first slide means secured to the third and fourth beam means and slidable on the first and second flanges of the first and second beam means.

6. The apparatus of claim 5 in which the first slide means includes a first slide element secured to the third flange and receiving a portion of the first flange, and a second slide element secured to the fourth flange and receiving a portion of the second flange.

7. The apparatus of claim 1 in which the bed means includes:

a front side having a first width,
a tail gate remote from the front side and having a second width which is wider than the first width,
side means extending from the front side of the tail gate, including portions tapering inwardly between the tail gate and the front side, and
bottom means extending from the front side to the tail gate, including a downwardly tapering portion extending rearwardly from the front side to provide a sloping first bottom portion.

8. The apparatus of claim 7 in which the bottom means further includes a generally horizontally disposed second bottom portion extending from the sloping first bottom portion to the tail gate.

9. The apparatus of claim 8 in which the bottom means includes means for pivoting the bed means relative to the first frame means for dumping the load.

10. The apparatus of claim 8 in which the side means includes means for pivoting the tail gate.

11. The apparatus of claim 1 in which the locking means includes
pin means, including a pin movable between a lock position and an unlock position to respectively lock and unlock the first and second frame means, and
aperture means, including a first aperture for receiving the pin of the pin means to lock the first and second frame means in the open position and a second aperture for receiving the pin of the pin means to lock the first and second frame means in the closed position.

12. The apparatus of claim 1 in which the first and second beam means include flanges disposed and movable within the slider means.

13. The apparatus of claim 12 in which the first and second slide bars extend along the third and fourth beam means, and the slider means, the first and second beam means, and the third and fourth beam means cooperate to define enclosures for the first and second slide bars and the flanges disposed within the slider means for preventing the entrance of undesirable elements and for retaining a lubricant for the slider means and the slide bars.

* * * * *